United States Patent [19]

Languillat

[11] Patent Number: 4,645,553

[45] Date of Patent: Feb. 24, 1987

[54] PROCESS AND APPARATUS FOR FORMING A MULTILAYER TUBE

[75] Inventor: Jean-Paul Languillat, Vallieres par Thorigny sur Oreuse, France

[73] Assignee: L'Homme, S.A., Pont sur Yonne, France

[21] Appl. No.: 739,927

[22] Filed: May 31, 1985

[30] Foreign Application Priority Data

Jul. 3, 1984 [FR] France ............................... 84 10498

[51] Int. Cl.[4] ............................................... B32B 31/00

[52] U.S. Cl. .................................... 156/153; 138/144; 138/145; 138/150; 156/195

[58] Field of Search ................................ 156/190–191, 156/195, 153; 138/144, 145, 146, 150

[56] References Cited

U.S. PATENT DOCUMENTS

| | | | |
|---|---|---|---|
| 2,751,936 | 6/1956 | Dunlap et al. | 156/195 X |
| 2,785,700 | 3/1957 | Yovanovich | 138/144 |
| 3,002,433 | 10/1961 | Dunlap | 138/144 X |
| 3,170,489 | 2/1965 | Cunningham | 138/145 |
| 3,300,159 | 1/1967 | Johnson et al. | |
| 3,430,543 | 3/1969 | Cunningham | 138/144 X |
| 3,451,433 | 6/1969 | Cunningham | 138/144 |
| 3,457,130 | 7/1969 | Morrison | |
| 3,545,494 | 12/1970 | Cunningham | 138/144 |
| 3,813,026 | 5/1974 | Biancamaria | 138/144 X |

FOREIGN PATENT DOCUMENTS

| | | |
|---|---|---|
| 3150774 | 1/1985 | Fed. Rep. of Germany . |
| 1458458 | 11/1966 | France . |
| 1563024 | 3/1969 | France . |
| 2121993 | 8/1972 | France . |
| 2302851 | 1/1976 | France . |
| 395594 | 2/1962 | Switzerland . |

*Primary Examiner*—David Simmons

*Attorney, Agent, or Firm*—Sandler & Greenblum

[57] ABSTRACT

Process for manufacturing a calibrated cardboard tube having minimal surface roughness and dimensional stability, involving helically winding a plurality of glued strips or plies around a mandrel and then polishing the exterior surface of the rough tube, coating the exterior surface with a thermosetting resin, cutting the tube, drying and compressing the cut pieces transversely together with applying heat, wherein at least the next-to-last ply and the last ply or strips of a dense material are impregnated with a thermosetting resin and, after coating and heat compression of the pieces, a final coating of a thermosetting resin is applied to the last plies before drying the coated surface and buffing or finish polishing to form a smooth surface, and the apparatus for performing the process.

20 Claims, 7 Drawing Figures

PROCESS AND APPARATUS FOR FORMING A MULTILAYER TUBE

BACKGROUND OF THE INVENTION

1. Field of the Invention

The invention relates to a process and apparatus for forming a cardboard tube which is calibrated to exhibit dimensional stability with minimal surface roughness.

2. Description of Background and Relevant Materials

It is known to continuously form cardboard tubes by helically winding a plurality of paper or cardboard strips on a machine called a "spiraler".

This type of machine comprises a fixed cylindrical mandrel on which is helically wound one or more strips, the lead-end of all except the first of which are previously glued to the tail-end of another, and which form predetermined angles with the axis of the mandrel. The tube which is formed is rotated and simultaneously translated longitudinally by a conveyor belt which winds around the resultant tube.

Each continuously formed cardboard tube is then cut during its formation into individual tubes, in a cutting or slicing station.

Depending upon the intended applications of the cardboard tubes, an attempt has been made to produce a tube having good geometric properties, i.e., calibrated to be concentric rather than oval, substantial resistance to atmospheric variations and/or a good surface state with minimal feathering or irregularities.

It is very difficult to obtain a perfect adjustment of the spiraler so that the adjacent edges of two spirals are absolutely joined or to obtain tubes directly at the outlet of the spiraler which have adequate characteristics for most applications. In addition to the previously mentioned concerns this is particularly true for winding thin films or sheets. In such cases there is a major concern for minimizing surface roughness and keeping the superficial hardness perfectly uniform and homogeneous so as to avoid marking the films under the pressure exerted thereon during winding.

Although French Pat. Nos. 1,563,024 and its two additions 95,882 and 2,121,993 relate to these concerns, they do not resolve all of these problems. French Pat. No. 1,563,024 and its first addition form the basis of U.S. Pat. No. 3,580,146. These patents are directed to a method of manufacturing a tube wherein a glued band of compressible material of low density, such as felt board, is wound into a rough tube formed in a conventional manner. In the disclosed procedure, compressible material is used for forming the next-to-last or penultimate ply whereas the last ply is formed from a strip of dense material. Afterwards, the surface of the tube is polished and then coated with a thermosetting resin. Finally, after cutting and drying the tube, each cut tube is passed across a heated drawplate in a manner so as to obtain the calibration, by pressing the next-to-last compressible ply, simultaneously with the polymerization of the resinous coating.

According to first addition No. 95,882, the polishing operation can be eliminated by a preparation and application of a particular glue to the last ply; the second addition No. 2,121,993 describes another heat compression means as an improvement over the drawplate described in the original patent and further discusses a possibility of eliminating the external resinous coating by utilizing a last porous ply which is glued onto the penultimate ply by means of a thermosetting resin.

These prior art processes and apparatus give good enough results for most purposes. The winding of magnetic films, for example video tape, however, requires a tube having a permanent shape, an uniform homogeneity of surface hardness, and an exterior surface with minimal roughness which is substantially more demanding than the typical situation.

These films are very thin and are subjected to extremely high pressures during winding. Consequently, such films are marked over a substantial number of turns due to imperfections in any of the previously mentioned characteristics on the surface of conventional tubes used as spools for these tapes.

In order to obtain better results it has become necessary to entirely re-think the problem. Although there exists, for example, a procedure for winding paper strips in an upright position over a plurality of turns, such a process is difficult, long, costly and poses the problem of joining the ends of adjacent strips.

Thus, the research efforts of the inventor has resulted with the discovery of a new process which solves these problems in a unique manner while preserving the advantages of conventional procedures for manufacturing of a spiraler.

SUMMARY OF THE INVENTION

An object of the present invention is to provide a procedure for coating a multi-layer tube wherein the last layer is subjected to a multiple coating operation wherein the final coating provides a hard, smooth surface on the exterior of the tube.

Another object of the present invention is a process for the manufacture of a cardboard tube, having minimal surface roughness, by helically winding a plurality of glued strips or plies around a mandrel, particularly involving the following operations: polishing the exterior surface of the rough tube, coating the exterior surface of the tube with a thermosetting resin, cutting the coated tube, drying the cut tube and applying heat while subjecting the tube to pressure; wherein at least the penultimate ply and the last ply are formed from strips of dense material and wherein at least penultimate ply is impregnated with a thermosetting resin before winding the said penultimate ply.

A further object of the present invention is a process for the manufacture of a multi-layer tube wherein a final coating of thermosetting resin is applied to a tube piece, previously coated and calibrated using a hot compression technique, followed by drying and finish-polishing to provide a smooth surface on the tube piece.

A still further object of the present invention is a process for forming a tube wherein at least the penultimate ply is beveled in a manner parallel to its two longitudinal edges, in a fashion such that the bevels of the two consecutive spirals of this ply are overlapping, and preferable wherein the edge of the last ply opposite the direction of movement of the tube is beveled in a manner so that the edge is covered by the overlapping, exposed edge of the next spiral.

A yet still further object of the invention is to provide a process for forming a tube involving a first polishing of the exterior surface of the rough tube using a narrow means for polishing adapted to make the exposed edge constituted by the exposed edge of the last ply disappear, followed by a second polishing which uses a wider means for polishing and which is adapted to buff the material of the last ply, and preferably wherein the process includes another polishing of the pieces of tube after hot compression and before the finish coating, which is preferable performed by a double simultaneous atomization/or spraying of resin and a catalyst for the resin.

A yet another still further object of the present invention is to perform the final polishing, after first sealing or plugging the open ends of the tube piece, using sprayed water to pick up the dust resulting from the polishing and to cool the pieces.

It is another object of the present invention to provide an apparatus for performing the process of the invention including a spiraler or winding machine for the manufacture of continuous tubes, a polishing station, a resin coating station, a cutting station, a drying station for the tube, a transverse compression station for the cut tube pieces, and further including downstream of the compression station, a coating station for the tube pieces, followed by a finish polishing station, wherein the coating station for the tube pieces is preferably preceded by a polishing station for the pieces, and wherein the first polishing station includes at least a first narrow means for polishing and a second wide means for polishing.

BRIEF DESCRIPTION OF DRAWINGS

The invention will be better understood with reference to the description which follows of one embodiment given by way of non-limiting example for illustration purposes.

DETAILED DESCRIPTION OF PREFERRED EMBODIMENTS

Figure 1:
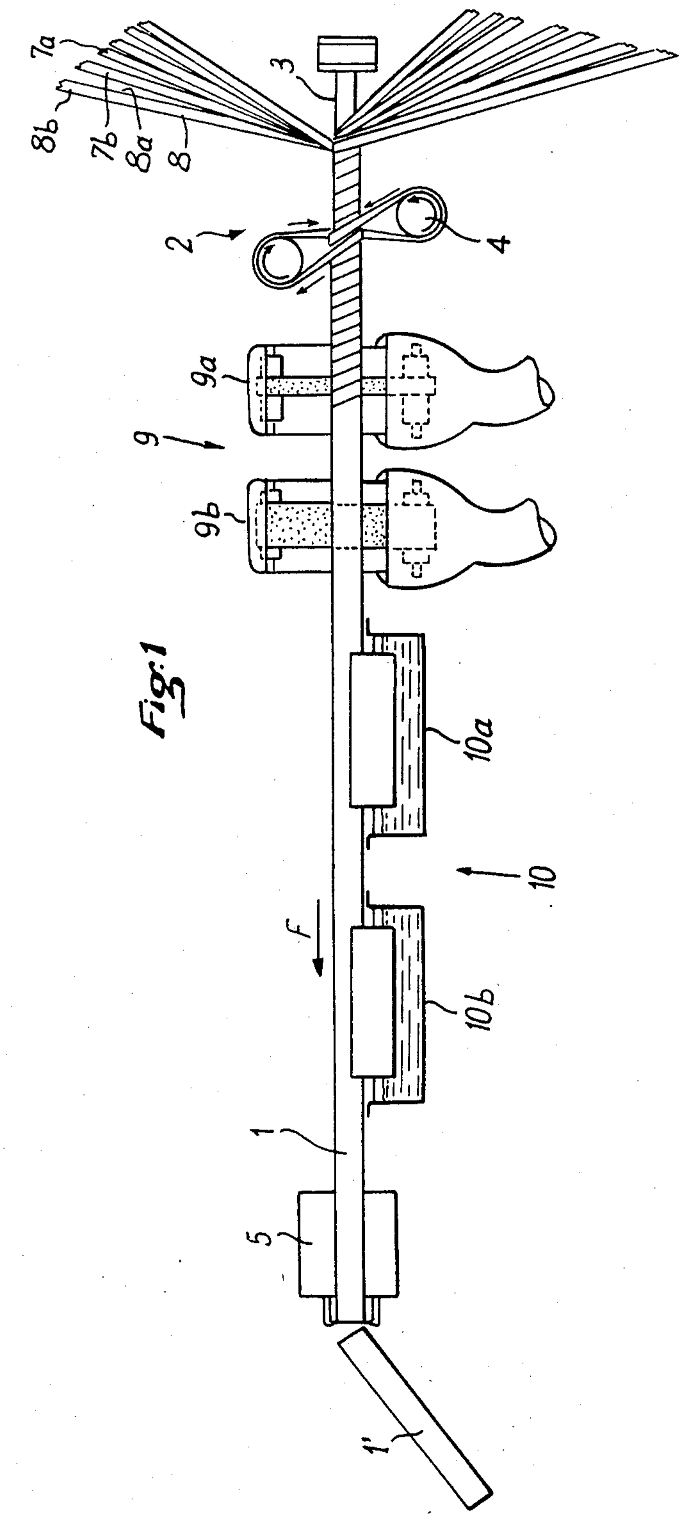
FIG. 1 schematically illustrates one portion of the apparatus according to the invention.
Figure 2:
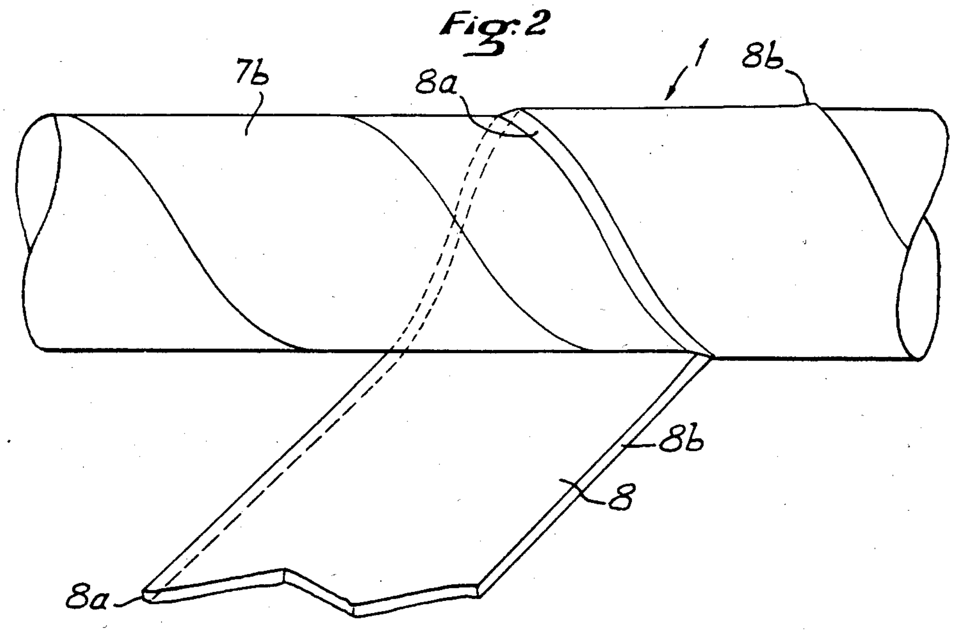
FIG. 2 illustrates one portion of the tube in the course of manufacture.

As may be seen from FIG. 1, a broad tube 1 is illustrated which is formed in a known manner for example by a spiraler or winding machine 2 adapted to hexically wind a plurality of glued strips around a mandrel 3, the rough tube being translationally moved along the direction of arrow F and rotated by an apparatus 4 having a conveyor belt.

Spiraler 2 is provided with a cutting station 5 adapted to form a plurality of pieces shown as 1' in FIGS. 1, 4 and 5, 6.

Figure 3:
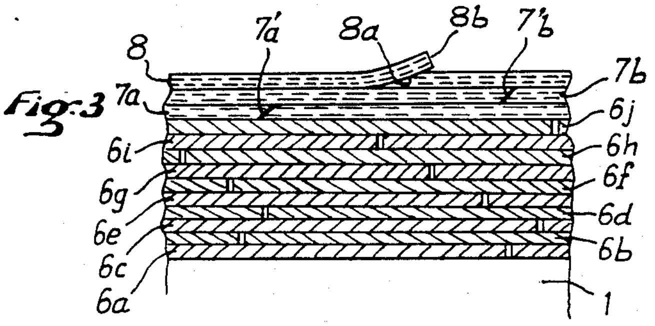
FIG. 3 is a partial longitudinal cross-section view of the unfinished tube.
Figure 7:
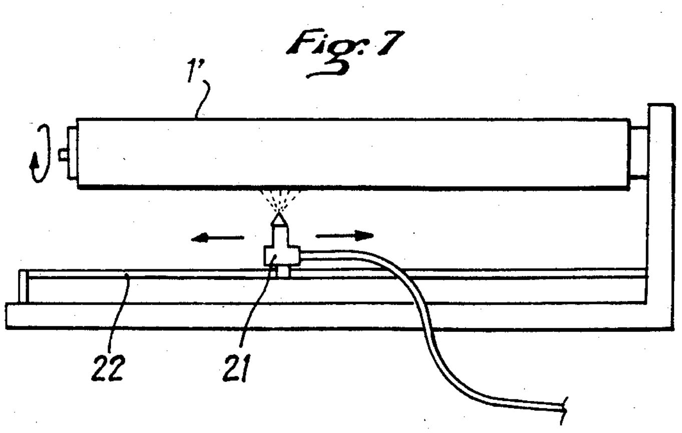
FIG. 7 schematically illustrates an atomization or spraying station for the pieces.

In the example shown in FIG. 3, the first "plies" of the tube, constituted by the first wound strips 6*a*–6*i*, are semi-joined spirals while the antepenultimate strip 7*a* and the penultimate strip 7*b* are adapted to constitute corresponding plies by being beveled on their two longitudinal edges in a manner so that the bevels 7'*a* and 7'*b* of the two consecutive spirals of each of these plies of strip 8 forming the last ply is bevelled on its surface which faces the exterior in a manner such that this edge 8*a* is covered or overlapped by the exposed edge 8*b* of the following spiral.

The first plies of the tube formed by strip 6*a*–6*i* are, for example, made from draft cardboard while the last ply, the penultimate ply and the antepenultimate ply, respectively, depicted as strips 8, 7*b*, and 7*a*, are made of a dense material having long fibers such as an impregnation paper, with band 8 being slightly wider than 7*a* and 7*b* which are moreover impregnated with a thermosetting resin, such a phenolic resin, before winding, for example, using apparatus provided the reels on which the strips are wound and stored. In its simplest form the embodiment described includes only two impregnated strips 7*a* and 7*b*, but preferable a larger number is contemplated.

As can be seen in FIG. 1, a polishing station 9 constituted by a first means 9*a* having a narrow polishing strip and a second means 9*b* having a wider polishing strip is positioned upstream cutting station 5. The first means 9*a* is for removing the ridge constituted by the exposed edge 8*b* of the exterior ply while means 9*b* is adapted to buff the exterior surface of the last ply.

The polishing station 9 in turn is followed by a coating station 10, constituted here by two containers 10*a* and 10*b* filled with a mixture containing a phenolic resin. The number of containers can of course be varied, as can the nature of the coating station, e.g., a spray or atomization device.

For greater clarity, stations 9 and 10 are shown in elevation while spiraler 2 is shown in planar view.

Figure 4:
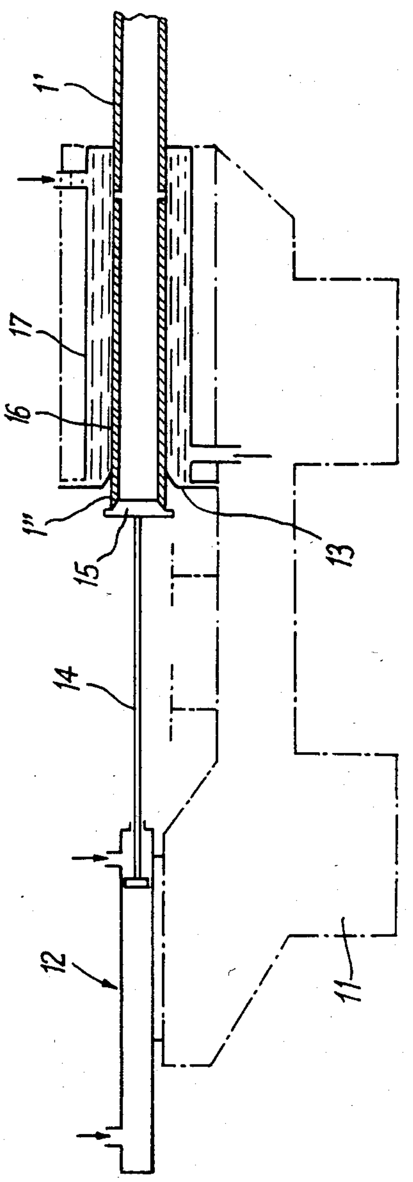
FIG. 4 is a diagram of a calibration apparatus for the two pieces.

After cutting at station 5, each cut tube piece is thoroughly dried before being worked in a drawplate apparatus shown in FIG. 4. Schematically, the apparatus of FIG. 4 is comprised of a support structure 11 provided with an hydraulic jack 12 and in a coaxial manner, a drawplate 13. The shaft 14 of jack 12 is provided with a head 15 adapted to press one of the ends of each tube piece introduced into a cylindrical core 16 of drawplate 13. The cylindrical core 16 is surrounded by a sealed envelope or jacket 17 in which a heated fluid circulates, in a manner such that the temperature of the core 16 of the drawplate corresponds to the polymerization temperature of the resin utilized at post 10 of FIG. 1.

The operation is relatively straightforward and FIG. 4 illustrates how a new piece 1' is introduced into the drawplate 13, after a withdrawal of shaft 14, removes the preceeding piece 1' from the drawplate 13.

Figure 6:
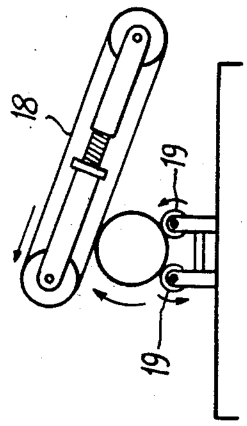
FIGS. 5 and 6, respectively, schematically illustrate in planar and side views of a polishing station for the two pieces.
Figure 5:
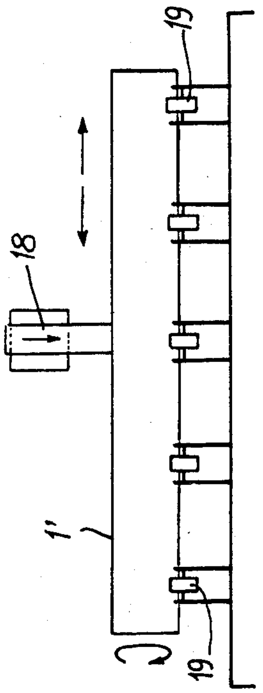

Thus calibrated, each piece is then brought to a polishing station shown schematically in FIGS. 5 and 6. This polishing station comprises a flexible abrasive strip 18 whose tension is adjustable and is applied to the piece to be worked which is positioned on a motorized carrier equipped with pulleys or rollers 19. Pulleys or rollers 19 may be oriented with respect to the cutting axis of the tube so that they can impart to the latter a rotational movement as well as a translational movement. The polishing is generally performed in a back and forth slow motion in a manner so as to cross the path of the tube. This polishing serves to modify the condition of the surface of the tube so as to improve the adhesion of the final coating to its surface. The polished pieces are then positioned on a lathe 20 shown schematically in a manner so as to come and go at a constant speed, in such a way as to homogenously and uniformly apply the coating. Spray gun 21 is fed with a thermosetting resin, for example of polyester. A polymerization catalyst may be mixed with the resin. Although one may utilize two guns, one gun having two heads so as to spray the resin and the catalyst at the same time is preferred. This spraying is generally performed in a back and forth motion of the spray gun to cross the path of the tube.

The coated pieces are then dried in ambient air or in an oven, each cut piece being placed in a vertical position. After drying, the cut pieces undergo a shining or smooth polishing in a finish polishing station similar to that of FIG. 5. In this polishing step, the grain of band of strip 18 is very fine. When the finish polishing step is performed using a spray of water to cool the tube piece and pick up dust resulting from polishing, the ends of the tube should first be plugged to prevent water from entering the interior of the tube.

It is important to note that the polishing of the pieces before and after the last coating are not conducted to change the geometry or shape of the pieces, which is accomplished by the preceding operations. As previously discussed the preliminary operations are responsible for putting a hard surface layer on a tube or cut piece of tube whose geometry is maintained thereby.

The final coating makes it possible to obtain a finished surface which is smooth and hard.

Numerous variations can be imagined without going beyond the scope of the invention particularly with respect to the means of polishing, coating and of hot compression.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Process for manufacturing a multilayer tube comprising:
- impregnating at least a strip of dense material with a thermosetting resin;
- helically winding a plurality of strips of material including a last strip and a next-to-last strip in a forward direction around a mandrel into overlapping spirals to form a tube wherein at least said last strip is a strip of dense material and at least said next-to-last strip is selected from said at least a strip of dense material;
- polishing the exterior surface of the tube;
- coating the exterior surface of the tube;
- drying the coated surface of the tube;
- subjecting the dried, coated surface of the tube to pressure so as to calibrate the tube to have a circular cross-section so that the resultant tube exhibits minimal surface roughness and a permanent shape;
- surface-coating the calibrated tube;
- drying the surface of the surface-coated, calibrated tube; and
- finish-polishing the dried, surface-coated, calibrated tube by shining to provide a smooth exterior surface.

2. A process in accordance with claim 1, wherein the coated tube is exposed to heat during drying and while subjecting the coated tube to pressure.

3. A process in accordance with claim 2, further comprising cutting the tube into pieces prior to drying.

4. A process in accordance with claim 1, wherein said finish-polishing involves spraying water onto the tube so as to cool the tube and to collect dust caused by polishing.

5. A process in accordance with claim 4, wherein the ends of said tubes are plugged before spraying water onto said tubes.

6. A process in accordance with claim 1, wherein the opposite longitudinal edges of at least the next-to-last strip are beveled so that the bevels of two consecutive spirals overlap.

7. A process in accordance with claim 1, wherein the forward longitudinal edge of said last strip is beveled and said beveled edge is overlapped by the other longitudinal edge of said last strip thereby forming a ridge on the surface of the overlapping spirals.

8. A process in accordance with claim 7, wherein said polishing involves buffing the surface of the tube in the area of the overlapped beveled edge to eliminate said ridge.

9. A process in accordance with claim 8, wherein said polishing further involves smoothing the buffed surface of the tube.

10. A process in accordance with claim 1, further comprising:
- subjecting the exterior surface of the calibrated tube to abrasion prior to said surface coating to improve the adhesion of said surface-coating to said surface.

11. A process in accordance with claim 1, wherein said surface-coating is performed by spraying the exterior surface of the calibrated tube with resin.

12. A process in accordance with claim 11, further comprising spraying the exterior surface of the calibrated tube with a polymerization catalyst for said resin.

13. A process in accordance with claim 12, wherein said spraying is a double, simultaneous spraying of said resin and said catylst.

14. An apparatus for manufacturing multilayer tubes comprising:
- a winding machine including a mandrel for helically winding a plurality of strips of material into a tube;
- a first polishing station located downstream and positioned adjacent said mandrel adapted to contact said tube;
- a first coating station located downstream from said first polishing station positioned so as to coat the surface of the tube as the tube passes by the coating station;
- a cutting station located downstream from said first coating station associated with said machine adapted to cut said tube into pieces;
- a drying station in communication with said machine to which the tube pieces are transferred for drying the surface of the coated tube pieces;
- a compression station in communication with said drying station to which the dried tube pieces are conveyed for calibrating the tube pieces into a permanent shape;
- another coating station located downstream from said compression station for applying a coating to the surface of the compressed tube piece; and
- a finish-polishing station located downstream from said another coating station for providing a smooth surface on the surface-coated tube piece.

15. An apparatus in accordance with claim 14, further comprising:
- a second polishing station located downstream from said compression station and upstream from said another coating station for preparing the surface of the tube pieces for subsequent coating.

16. An apparatus in accordance with claim 14, wherein said first polishing station includes at least a first means for polishing and a second means for polishing, said first means for polishing being narrower than said second means for polishing.

17. A multilayer tube produced by the process of claim 1.

18. A multilayer tube produced by the process of claim 6.

19. A multilayer tube produced by the process of claim 9.

20. A multilayer tube produced by the process of claim 13.

* * * * *

UNITED STATES PATENT AND TRADEMARK OFFICE

CERTIFICATE OF CORRECTION

PATENT NO. : 4,645,553

DATED : February 24, 1987

INVENTOR(S) : Jean-Paul LANGUILLAT

It is certified that error appears in the above-identified patent and that said Letters Patent is hereby corrected as shown below:

In column 3, line 4, change "preferable" to ---preferably--- before "performed";

In column 4, line 12, change "a" to ---as--- before "phenolic resin";

line 16, change "perferable" to ---preferably--- before "a larger number";

In column 6, line 37, change "catylst" to ---catalyst--- after "and said".

Signed and Sealed this

Fifth Day of January, 1988

*Attest:*

DONALD J. QUIGG

*Attesting Officer*

*Commissioner of Patents and Trademarks*